United States Patent
Lensvelt et al.

(10) Patent No.: US 6,228,915 B1
(45) Date of Patent: May 8, 2001

(54) COMPOSITIONS AND METHODS FOR REDUCED FOOD ADHESION

(75) Inventors: Cornelis Johannes Lensvelt; Jan Paul Penning; Robert Puyenbroek, all of Bergen op Zoom (NL)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/292,716

(22) Filed: Apr. 15, 1999

(51) Int. Cl.[7] .............................. C08K 5/20; C08K 5/50; C08K 5/42; C08L 79/08; A47J 27/00
(52) U.S. Cl. ................... 524/230; 524/154; 524/157; 524/159; 524/313; 524/315; 524/318; 524/606; 524/609; 524/611; 524/231; 99/324; 99/403; 220/573.1; 220/573.2; 220/912
(58) Field of Search ..................... 524/313, 315, 524/318, 230, 154, 157, 159, 606, 609, 611, 231; D7/354; 99/324, 403; 220/573.1, 573.2, 912

(56) References Cited

U.S. PATENT DOCUMENTS

| | | | |
|---|---|---|---|
| 4,772,653 | 9/1988 | McKenna | 524/427 |
| 4,943,380 * | 7/1990 | Sugiura et al. | 524/124 |
| 5,055,508 * | 10/1991 | Ohtsubo | 524/318 |
| 5,115,004 * | 5/1992 | Mochizuki et al. | 524/318 |
| 5,187,214 * | 2/1993 | Govindan | 524/157 |
| 5,210,124 * | 5/1993 | Hovatter et al. | 524/315 |
| 5,238,985 * | 8/1993 | O'henick, Jr. | 524/318 |
| 5,244,954 * | 9/1993 | Fasulo et al. | 524/318 |
| 5,348,995 * | 9/1994 | Anderson | 524/157 |
| 5,418,269 * | 5/1995 | Ishiwa et al. | 524/318 |
| 5,482,987 * | 1/1996 | Forschirm | 524/230 |
| 5,494,952 * | 2/1996 | Hirata et al. | 524/154 |
| 5,502,099 * | 3/1996 | Wallace | 524/413 |
| 5,668,202 * | 9/1997 | Hirata et al. | 524/154 |
| 5,780,576 * | 7/1998 | Weber et al. | 525/432 |
| 5,888,434 * | 3/1999 | Mahoney et al. | 264/211.2 |
| 6,001,957 * | 12/1999 | Puyenbroek et al. | 524/606 |
| 6,011,086 * | 1/2000 | Grant et al. | 524/318 |

FOREIGN PATENT DOCUMENTS

| | | |
|---|---|---|
| 0 330 488 A1 | 8/1989 | (EP) . |
| 0 405 269 A1 | 1/1991 | (EP) . |
| 0 675 928 B1 | 10/1995 | (EP) . |
| 0 786 290 A1 | 7/1997 | (EP) . |
| WO 92/07026 | 4/1992 | (WO) . |

* cited by examiner

Primary Examiner—Peter Szekely

(57) ABSTRACT

The invention relates to compositions and methods for reducing food deposit adhesion to cookware. More specifically this invention relates to a resin composition having a glass transition temperature of at least 180° C. containing an amount of at least one additive selected from fatty acid esters, fatty acid amide, anionic surfactant, or a mixture containing at least one of the foregoing to reduce food deposit adhesion on cookware made from the composition. The invention also relates to a method for providing plastic cookware having reduced food deposit adhesion.

18 Claims, No Drawings

COMPOSITIONS AND METHODS FOR REDUCED FOOD ADHESION

CROSS-REFERENCE TO RELATED APPLICATIONS

Not applicable.

FEDERALLY SPONSORED RESEARCH

Not applicable.

BACKGROUND OF THE INVENTION

1. Field of the Invention

The invention relates to compositions and methods for reducing food deposit adhesion to cookware. More specifically this invention relates to a resin composition having a glass transition temperature of at least 180° C. containing an amount of at least one fatty acid ester, fatty acid amide, anionic surfactant, or a mixture containing at least one of the foregoing to reduce food deposit adhesion on cookware made from the composition. The invention also relates to a method for providing plastic cookware having reduced food deposit adhesion.

2. Brief Description of the Related Art

Plastic cookware has gained increased acceptance and use in recent years due in part to their relatively low cost, durability with light weight, and flexibility in design. Unfortunately, adhesion of food deposits and the accompanying stains as observed with more traditional metal cookware is also obtained with plastic cookware. Non-stick cookware has been developed as a solution to adhesion of food deposits to reduce sticking and ease cleaning.

Methods to prepare non-stick cookware generally involve application of a surface treatment or lamination of a thin non-stick layer to the surface of the cookware. These methods are expensive and reduce the cycle time of the manufacturing process. What is needed in the art is a method for reducing the adhesion of food deposits on plastic cookware without secondary steps.

SUMMARY OF THE INVENTION

The method of the present invention to reduce adhesion of food deposits on cookware comprises a resin with a glass transition temperature of at least 180° C. and an amount of at least one additive selected from fatty acid esters, fatty acid amide, anionic surfactant, or a mixture containing at least one of the foregoing effective to reduce food deposit adhesion on cookware made from the composition. The invention also includes the compositions and articles made from the compositions having reduced adhesion of food deposits. Various features and advantages of the present invention will be appreciated and understood by those skilled in the art from the following detailed description.

DETAILED DESCRIPTION OF THE INVENTION

According to this invention, there is a method provided to reduce adhesion to food deposit on cookware made from at least one resin having a glass transition temperature of at least 180° C. The need for the high glass transition temperature is to allow for the high temperatures common during food preparation. Accordingly, the resins have to have sufficient heat resistance to resist deformation during use. Suitable resins include polycarbonates, polyimides, polyamides, polyamideimides, polysulfones, polyethersulfones, polyarylsulfones, polyphenylsulfones, polyetherketones, aromatic copolyesters, and polyetherimides as well as various blends containing at least one of the foregoing resins. These resins are generally known in the art as are methods for the preparation.

In one embodiment, the resin is a polyetherimide resin comprising structural units of the formula (I):

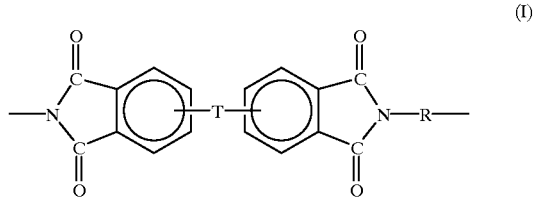

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II):

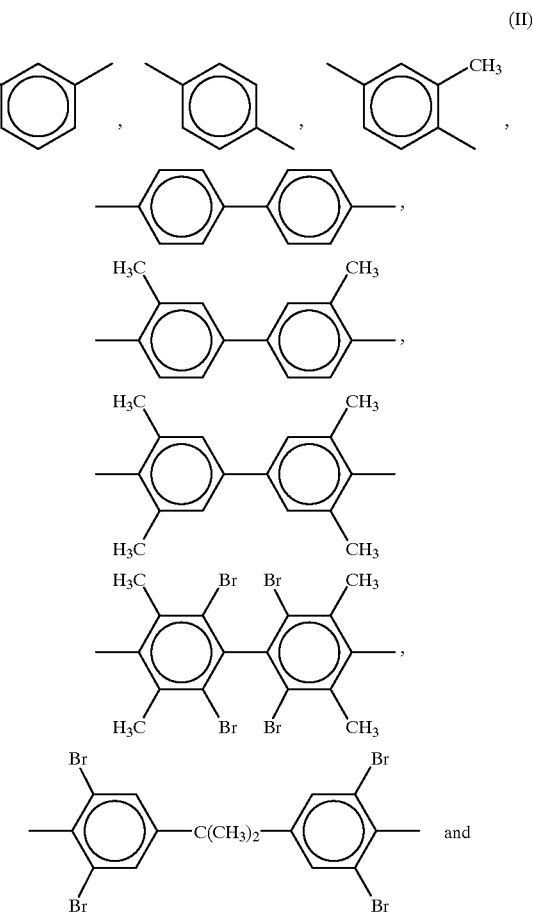

-continued

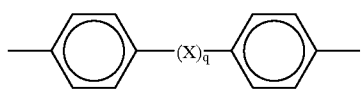

wherein X is a member selected from the group consisting of divalent radicals of the formulae (III):

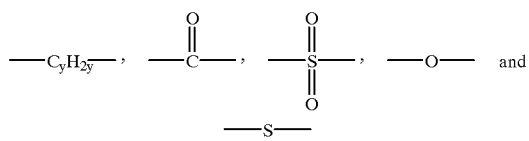
(III)

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

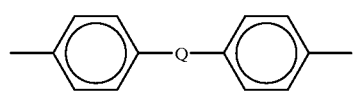
(IV)

where Q is a member selected from the group consisting of formulae (V):

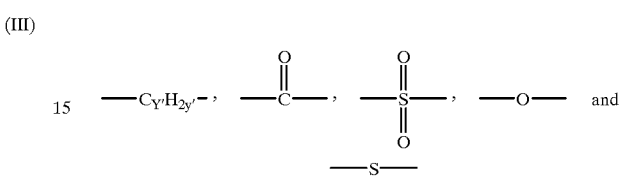
(V)

where y' is an integer from about 1 to about 5. A particularly preferred polyetherimide resin is the reaction product formed by melt polymerization of 2,2-bis[4-(3,4-dicarboxyphenoxy)phenyl]propane dianhydride with one or more of paraphenylene diamine and metaphenylene diamine. The resins are commercially available from GE Plastics under the mark ULTEM resins.

Other particularly useful resin include polysulfones of the formulae (VI), (VI), (VIII), (IX), and (X):

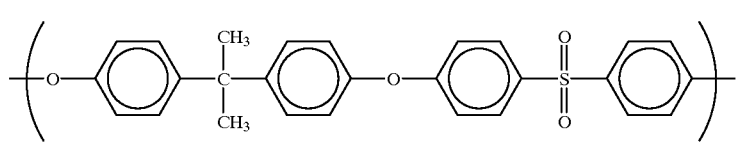
(VI)

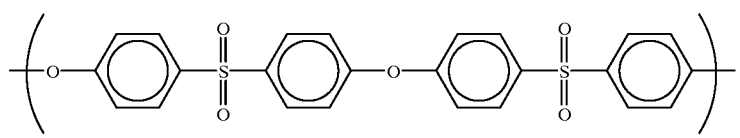
(VII)

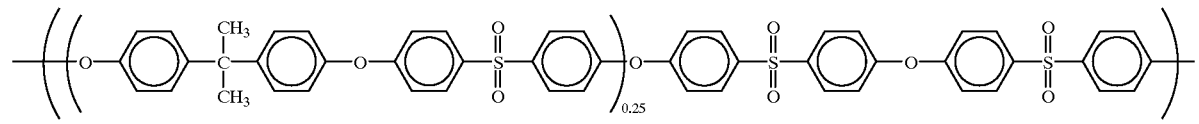
(VIII)

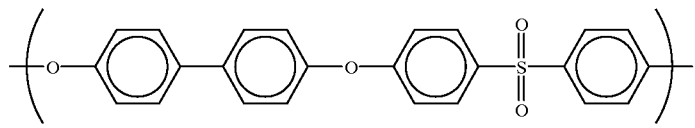
(IX)

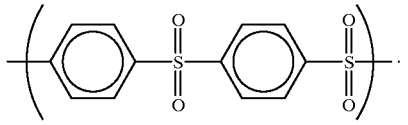
(X)

These materials are commercially available from BASF, Amoco, and ICI under a variety of tradenames.

A second key component of the present invention is an amount of at least one fatty acid ester, fatty acid amide, anionic surfactant, or a mixture containing at least one of the foregoing effective to reduce food deposit adhesion on articles and cookware made from the composition.

The fatty acid esters and fatty acid amides of this invention are derivatives of saturated and unsaturated normal fatty acids having from about fourteen to about thirty-six carbon atoms, inclusive. Representative fatty acids are, for example, tetradecanoic, pentadecanoic, hexadecanoic, heptadecanoic, octadecanoic, nonadecanoic, eicosanoic, henecosanoic, decosanoic, tricosanoic, tetracosanoic, pentacosanoic, hexacosanoic, triacontanoic, hentriacontanoic, dotriacontanoic, tetratriacontanoic, pentatriacontanoic, hexatriacontanoic acids, myristic, palmitic, stearic, arachidic, behenic and hexatrieisocontanoic ($C_{36}$) acids, palmitoleic, oleic, linolenic and cetoleic, and the like.

The methods of preparation of fatty acid esters and fatty acid amides employed are generally known in the art. For example, fatty acid esters are commonly prepared by the reaction of an alcohol and a fatty acid or a fatty acid derivative, such as a fatty acid halide. Polyols are also useful to prepare fatty acid polyesters as are the corresponding polyamines to prepare fatty acid polyamides. Representative polyols are ethylene glycol, 1,3-propanediol, 1,4-butanediol, 1,5-pentanediol 1,6-hexanediol, a polyglycol such as diethylene glycol, triethylene glycol, dipropylene glycol, dibutylene glycol, trimethylene glycol, isobutylene-ethylene glycol, trimethylene glycol; the monoethyl, monopropyl or monobutyl ethers of glycerol, dicyclopentadienyl dimethanol, pentaerythritol, dipentaerythritol, tripentaerythritol, trimethylolpropane, trimethylolethane, etc., glycerol, glycerol mono-acetate, mannitol, sorbitol, xylose, and the like, or mixtures thereof.

In one embodiment of the invention, fatty amides are preferred as the food releasing additive. Included as additives are saturated fatty acid monoamide (preferably, lauramide, palmitamide, arachidamide behenamide, stearamide, 12 hydroxy stearamide); unsaturated fatty acid monoamide (preferably, oleamide, erucamide, recinoleamide); and N-substituted fatty acid amide (more preferably, N-stearyl stearamide, N-behenyl behenamide, N-stearyl behenamide, N-behenyl stearamide, N-oleyl oleamide, N-oleyl stearamide, N-stearyl oleamide, N-stearyl erucamide, erucyl erucamide, and erucyl stearamide, N-oleyl palmitamide, methylol amide (more preferably, methylol stearamide, methylol behenamide); saturated fatty acid bis-amide (more preferably, methylene bis-stearamide, ethylene bis-stearamide, ethylene bis-isostearamide, ethylene bis-hydroxystearamide, ethylene bis-behenamide, hexamethylene bis-stearamide, hexamethylene bis-behenamide, hexamethylene bis-hydroxystearamide, N,N'-distearyl adipamide, N,N'-distearyl sebacamide); unsaturated fatty acid bis-amide (more preferably, ethylene bis-oleamide, hexamethylene bis-oleamide, N,N'-dioleyl adipamide, N,N'-dioleyl sebacamide; saturated or unsaturated fatty acid tetra amide, stearyl erucamide, ethylene bis stearamide and ethylene bis oleamide.

A large number of useful fatty amides are commercially available from Humko Chemical Company, Memphis, Tenn. under the Kemamide tradename and include, for example, Kemamide B (behenamide/arachidamide), Kemamide W40 (N,N'-ethylenebisstearamide), Kemamide P181 (oleyl palmitamide), Kemamide S (stearamide), Kemamide U (oleamide), Kemamide E (erucamide), Kemamide O (oleamide), Kemamide W45 (N,N'-ethylenebisstearamide), Kenamide W20 (N,N'-ethylenebisoleamide), Kemamide E180 (stearyl erucamide), Kemamide E221 (erucyl erucamide), Kemamide S180 (stearyl stearamide), Kemamide S221 (erucyl stearamide), and the like. In addition, useful fatty amides are commercially available from Croda Universal Ltd., Hull East Yorkshire, England, under the Crodamide tradename and include, for example, Crodamide OR (oleamide), Crodamide ER (erucamide), Crodamide SR (stereamide), Crodamide BR (behenamide), Crodamide 203 (oleyl palmitamide), Crodamide 212 (stearyl erucamide), and the like.

Another useful group useful as food release additives are the phosphonium sulfonates illustrated by the general formula (XI) below:

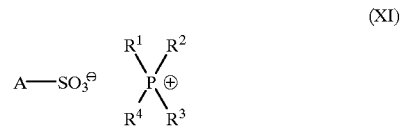

(XI)

wherein A is an alkyl group with 1–36 carbon atoms, alkenyl group with 4–24 carbon atoms, phenyl group, phenyl group substituted by alkyl group with 1–18 carbon atoms, naphthyl group or naphthyl group substituted by alkyl group with 1–18 carbon atoms, $R^1$, $R^2$ and $R^3$ are identical, each being an aliphatic hydrocarbon group with 1–8 carbon atoms or aromatic hydrocarbon group, and $R^4$ is a hydrocarbon group with 1–18 carbon atoms.

Phosphonium sulfonate shown by (XI) is composed of an organic sulfonate anion and an organic phosphonium cation. Examples of such organic sulfonate anion include aliphatic sulfonates such as methyl sulfonate, ethyl sulfonate, propyl sulfonate, butyl sulfonate, octyl sulfonate, lauryl sulfonate, myristyl sulfonate, hexadecyl sulfonate, 2-ethylhexyl sulfonate, docosyl sulfonate and tetracosyl sulfonate and their mixtures, substituted phenyl sulfonates such as p-tosylate, butylphenyl sulfonate, dodecylphenyl sulfonate, octadecylphenyl sulfonate, and dibutylphenyl, sulfonate, and substituted or unsubstituted naphthyl sulfonates such as naphthyl sulfonate, diisoprophyl naphthyl sulfonate and dibutylnaphthyl sulfonate. Examples of aforementioned phosphonium cation include aliphatic phosphonium such as tetramethyl phosphonium, tetraethylphosophonium, tetrabutyl phosphonium, triethylmethyl phosphonium, tributylmethyl phosphonium, tributylethyl phosphonium, trioctylmethyl phosphonium, trimethylbutyl phosphonium, trimethyloctyl phosphonium, trimethyllauryl phosphonium, trimethylstearyl phosphonium, triethyloctyl phosphonium and tributyloctyl phosphonium and aromatic phosphoniums such as tetraphenyl phosphonium, triphenylmethyl phosphonium, triphenylbenzyl phosphonium, and tributylbenzyl phosphonium.

Phosphonium sulfonates of the present invention can be obtained by any combination of any of these organic sulfonate anions and organic phosphonium cations but this invention is not limited by the examples given above. Phosphonium sulfonate of the present invention can be produced by mixing metal salt of corresponding organic sulfonate and quaternary phosphonium salt in a solvent and washing out the byproduct inorganic salt with water or extracting the product with an organic solvent such as methanol, isopropanol or acetone.

Also useful are the ammonium sulfonate analogues of the phosphonium sulfonates. In these additives, the quaternary phosphonium salt is replaced by an ammonium salt. In certain embodiments of the present invention, preferred ammonium salts include monoethanolamine, triethanolamine, and lower alkylammonium salts including those having from three to about ten carbon atoms such as isopropyl ammonium, tetramethyl ammonium, and tetrabutyl ammonium salts.

An effective food releasing amount of the additive is employed in the thermoplastic composition. Any amount of additive that reduces the amount of food adhesion to obtain an acceptable cleanliness after washing is an effective food releasing amount. In general, effective amounts of the additives ranges from about 0.1 to about 5.0 weight percent, based on the total weight of the composition.

Compositions of the present invention can also include effective amounts of at least one additive selected from the group consisting of anti-oxidants, flame retardants, drip retardants, crystallization nucleators, dyes, pigments, colorants, reinforcing agents, fillers, stabilizers, antistatic agents, plasticizers and lubricants to change the properties/characteristics of the composition. These additives are known in the art, as are their effective levels and methods of incorporation. Effective amounts of the additives vary widely, but they are usually present in an amount up to about 50% or more by weight, based on the weight of the entire composition.

Mineral fillers are utilized in one embodiment of the invention. Useful mineral fillers include clays, talcs, micas, barium sulfate, titanium dioxide, wollastonites, zinc oxides, and the like. An especially preferred mineral filler is titanium dioxide. When used, the amount of mineral filler is generally up to about 50% by weight based on the weight of the entire composition.

Preparation of the compositions of the present invention is normally achieved by melt blending the ingredients under conditions for the formation of an intimate blend. Such conditions often include mixing in single or twin screw type extruders or similar mixing devices which can apply a shear to the components. It is often advantageous to apply a vacuum to the melt through a vent port in the extruder to remove volatile impurities in the composition.

All of the ingredients may be added initially to the processing system, or else certain additives may be pre-compounded with each other. It appears that certain properties, such as impact strength and elongation, are sometimes enhanced by initially pre-dispersing any fillers with a portion of the resin to make a concentrate and subsequently letting down the concentrate with additional resin and any additional ingredients. While separate extruders may be used, these compositions may also be prepared by using a single extruder having multiple feed ports along its length to accommodate the addition of the various components. It is also sometimes advantageous to employ at least one vent port in each section between the feed ports to allow venting (either atmospheric or vacuum) of the melt. Those of ordinary skill in the art will be able to adjust blending times and temperatures, as well as component addition location and sequence, without undue additional experimentation.

The compositions of the present invention are useful for making molded articles such as cooking utensils and baking trays and pans as well as various other molded articles. It should be clear that the present invention affords a method to reduce food adhesion to molded articles as well as a method to provide easier cleaning of molded articles.

All references cited herein are hereby incorporated in their entireties.

The following examples are provided to illustrate the process according to the present invention. It should be understood that the examples are given for the purpose of illustration and do not limit the invention.

EXAMPLES

Example 1

A typical example of the claimed composition comprises 88.0% by weight of polyetherimide resin (Ultem® 1010-1000, Vicat softening point of 215° C.), 10.7% by weight of $TiO_2$ and 1.3% by weight of pentaerithritol tetrastearate (PETS). A dry-mixture of polyetherimide resin and PETS is fed, simultaneously with $TiO_2$ powder, to the throat of a 25 mm twin screw extruder operated at 300 rpm and 360° C. The resulting material is pelletized, dried and Dynatup disks are injection molded using a 130 ton Stork injection molding unit at melt temperature 360° C., injection pressure 80 bar and mold temperature 160° C.

The adhesion to food deposits of the above blend formulation was determined according to the following procedure: The Dynatup disks were wetted with a starch solution (Roux Blanc), dried and heated at 180° C. in air for 20 min. The soiled disks were washed for ca. 2 min at 65° C. in a Hobart multitank dishwasher using a 3g/100ml Divojet (alkaline) detergent solution. The washed samples were stained with potassium iodide solution to detect the presence of carbohydrate residues on the substrate. All tests were done in duplo, i.e. using two disks of a given formulation. Each sample were subjected to the described treatment five times and the cleanliness of the sample surface were rated visually after each test. The average performance (i.e., surface cleanliness after washing) for each formulation was rated according to the following scale: 1=very bad; 2=poor; 3=reasonable; 4=good. The described test was performed at DiverseyLever, Maarssenbroeksedijk 2, P.O. Box 10, 3600AA Maarssen, The Netherlands.

Mechanical, impact and heat properties of injection molded test bars were tested according to standard ISO procedures. Results are given in Table 1.

Example 2

As Example 1, with a composition comprising 88.0% by weight of polyetherimide resin (Ultem® 1010-1000), 10.7% by weight of $TiO_2$ and 1.3% by weight of N,N'-ethylenebis stearamide (EBS).

Example 3

As Example 1, with a composition comprising 88.4% by weight of polyetherimide resin (Ultem® 1010-1000), 10.7% by weight of $TiO_2$ and 0.9% by weight of stearyl erucamide (Crodamide 212).

Example 4

As Example 1, with a composition comprising 88.0% by weight of polyetherimide resin (Ultem® 1010-1000), 10.7% by weight of $TiO_2$ and 1.3% by weight of tetrabutyl phosphonium dodecylbenzene sulfonate (EPA).

Example 5

As Example 1, with a composition comprising 88.0% by weight of polyetherimide resin (Ultem® 1010-1000), 10.7% by weight of $TiO_2$ and 1.3% by weight of sodium-alkyl sulfonate, wherein alkyl corresponds to a mixture of $C_{10-18}$ saturated alkyl residues. China ware, a typical material used in applications described in this invention, is also include in the Examples for comparison purposes.

TABLE 1

Properties of thermoplastic compositions described in the Examples.

| | Reference | China ware | Example 1 | Example 2 | Example 3 | Example 4 | Example 5 |
|---|---|---|---|---|---|---|---|
| Ultem 1010 | 89.3% | N/A | 88.0% | 88.0% | 88.4% | 88.0% | 88.0% |
| Inorg. Filler | 10.7% $TiO_2$ | N/A | 10.7% $TiO_2$ | 10.7% $TiO_2$ | 10.7% $TiO_2$ | 10.7% $TiO_2$ | 10.7% $TiO_2$ |
| Additive | N%A | N/A | 1.3%-PETS | 1.3% EBS | 0.9% C212 | 1.3% EPA | 1.3% sodium alkyl sullonate |
| Food Adhesion Rating | 1(very bad) | 1(very bad) | 3(reasonable) | 3(reasonable) | 4(good) | 2(poor) | 3(reasonable) |
| E-Modulus (MPa) | 3458 | | 3521 | 3579 | 3588 | 3507 | 3445 |
| Yield Stress (MPa) | 111 | | 112 | 93 | 117 | 113 | 102 |
| Yield Strain (%) | 6.5 | | 6.4 | 3.3 | 6.5 | 6.6 | 5.9 |
| INI (kJ/m2) | 4.6 | | 4.9 | 4.0 | 5.0 | 3.4 | 6.6 |
| Vicat (° C.) | 216 | | 209 | 204 | 207 | 209 | 212 |

As can be noted by the above data, reduced food deposit adhesion on articles was achieved with the compositions of the invention. This result was unexpected based on the prior art for reducing food deposit adhesion on articles.

The preceding examples are set forth to illustrate specific embodiments of the invention and are not intended to limit its scope. It should be clear that the present invention includes articles from the compositions as described herein. Additional embodiments and advantages within the scope of the claimed invention will be apparent to one of ordinary skill in the art.

What is claimed:

1. A resin composition comprising:
   about 49.9 weight percent to about 99.9 weight percent of a polyetherimide;
   about 0.1 weight percent to about 5.0 weight percent of a fatty amide selected from the group consisting of lauramide, palmitamide, arachidamide, behenamide, stearamide, 12-hydroxystearamide, oleamide, erucamide, recinoleamide, N-stearyl stearamide, N-behenyl behenamide, N-stearyl behenamide, N-behenyl stearamide, N-oleyl oleamide, N-oleyl stearamide, N-stearyl oleamide, N-stearyl erucamide, erucyl stearamide, erucyl erucamide, N-oleyl palmitamide, methylol stearamide, methylol behenamide, methylene bis-stearamide, ethylene bis-stearamide, ethylene bis-isostearamide, ethylene bis-hydroxystearamide, ethylene bis-behenamide, hexamethylene bis-stearamide, hexamethylene bis-behenamide, hexamethylene bis-hydroxystearamide, N,N'-distearyl adipamide, and N,N'-distearyl sebacamide, ethylene bis-oleamide, hexamethylene bis-oleamide, N,N'-dioleyl adipamide, and N,N'-dioleyl sebacamide; and
   up to about 50 weight percent of a mineral filler;
   wherein all the weight percentages are based on the total weight of the composition.

2. The composition of claim 1, wherein the resin is a polyetherimide resin comprising structural units of the formula (I):

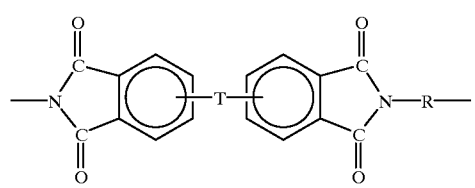

(I)

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II):

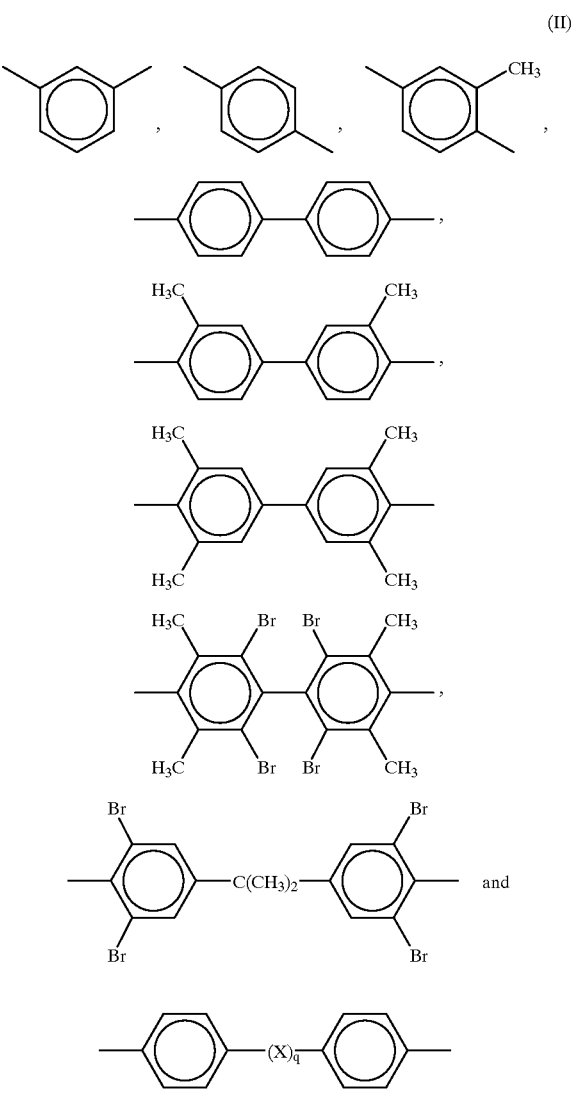

(II)

wherein X is a member selected from the group consisting of divalent radicals of the formulae (III):

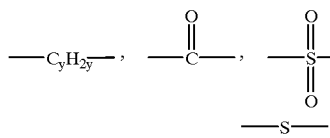

(III)

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

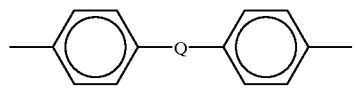

(IV)

where Q is a member selected from the group consisting of formulae (V):

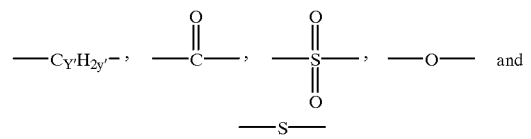

(V)

where y' is an integer from about 1 to about 5.

3. The composition of claim 1, wherein the resin is a polyetherimide resin is the reaction product formed by melt polymerization of 2,2-bis[4-(3,4-dicarboxyphenoxy)phenyl] propane dianhydride with one or more of paraphenylene diamine and metaphenylene diamine.

4. The composition of claim 1, wherein the fatty amide comprises at least one fatty amide selected from the group consisting of behenamide, arachidamide, ethylene-bis-stearamide, N-oleyl palmitamide, stearamide, oleamide, erucamide, ethylenebis-oleamide, N-stearyl erucamide, erucyl erucamide, N-stearyl stearamide, and N-erucyl stearamide.

5. The composition of claim 1, wherein the additive is N,N'-ethylenebisstearamide.

6. The composition of claim 1, wherein the additive is stearyl erucamide.

7. The composition of claim 1 further comprising at least one additive selected from the group consisting of antioxidants, flame retardants, drip retardants, crystallization nucleators, dyes, pigments, colorants, reinforcing agents, fillers, stabilizers, antistatic agents, plasticizers, and lubricants.

8. The composition of claim 1, wherein the mineral filler comprises at least one filler selected from the group consisting of clays, talcs, micas, barium sulfate, titanium dioxide, wollastonites, and zinc oxides.

9. A resin composition consisting essentially of:
about 49.9 weight percent to about 99.9 weight percent of a polyetherimide;
about 0.1 weight percent to about 5.0 weight percent of a fatty amide selected from the group consisting of lauramide, palmitamide, arachidamide, behenamide, stearamide, 12-hydroxystearamide, oleamide, erucamide, recinoleamide, N-stearyl stearamide, N-behenyl behenamide, N-stearyl behenamide, N-behenyl stearamide, N-oleyl oleamide, N-oleyl stearamide, N-stearyl oleamide, N-stearyl erucamide, erucyl stearamide, erucyl erucamide, N-oleyl palmitamide, methylol stearamide, methylol behenamide, methylene bis-stearamide, ethylene bis-stearamide, ethylene bis-isostearamide, ethylene bis-hydroxystearamide, ethylene bis-behenamide, hexamethylene bis-stearamide, hexamethylene bis-behenamide, hexamethylene bis-hydroxystearamide, N,N'-distearyl adipamide, and N,N'-distearyl sebacamide, ethylene bis-oleamide, hexamethylene bis-oleamide, N,N'-dioleyl adipamide, and N,N'-dioleyl sebacamide; and
up to about 50 weight percent of a mineral filler;
wherein all the weight percentages are based on the total weight of the composition.

10. A method for reducing food deposit adhesion on cookware wherein the method comprises:
cooking using cookware comprising a resin composition comprising
about 49.9 weight percent to about 99.9 weight percent of a polyetherimide;
about 0.1 weight percent to about 5.0 weight percent of a fatty amide selected from the group consisting of lauramide, palmitamide, arachidamide, behenamide, stearamide, 12-hydroxystearamide, oleamide, erucamide, recinoleamide, N-stearyl stearamide, N-behenyl behenamide, N-stearyl behenamide, N-behenyl stearamide, N-oleyl oleamide, N-oleyl stearamide, N-stearyl oleamide, N-stearyl erucamide, erucyl stearamide, erucyl erucamide, N-oleyl palmitamide, methylol stearamide, methylol behenamide, methylene bis-stearamide, ethylene bis-stearamide, ethylene bis-isostearamide, ethylene bis-hydroxystearamide, ethylene bis-behenamide, hexamethylene bis-stearamide, hexamethylene bis-behenamide, hexamethylene bis-hydroxystearamide, N,N'-distearyl adipamide, and N,N'-distearyl sebacamide, ethylene bis-oleamide, hexamethylene bis-oleamide, N,N'-dioleyl adipamide, and N,N'-dioleyl sebacamide; and
up to about 50 weight percent of a mineral filler;
wherein all weight percentages are based on the total weight of the composition.

11. The resin composition of claim 1, wherein the fatty amide comprises at least one N-substituted fatty amide selected from the group consisting of N-stearyl stearamide, N-behenyl behenamide, N-stearyl behenamide, N-behenyl stearamide, N-oleyl oleamide, and N-oleyl palmitamide.

12. The resin composition of claim 1, wherein the fatty amide comprises at least one saturated fatty acid bis-amide selected from the group consisting of methylene-bis-stearamide, ethylene bis-stearamide, ethylene bis-isostearamide, ethylene-bis-hydroxystearamide, ethylene bis-behenamide, hexamethylene bis-stearamide, hexamethylene bis-behenamide, hexamethylene bis-hydroxystearamide, N,N'-distearyl adipamide, and N,N'-distearyl sebacamide.

13. A resin composition consisting of:

about 49.9 weight percent to about 99.9 weight percent of a polyetherimide;

about 0.1 weight percent to about 5.0 weight percent of a fatty amide selected from the group consisting of lauramide, palmitamide, arachidamide, behenamide, stearamide, 12-hydroxystearamide, oleamide, erucamide, recinoleamide, N-stearyl stearamide, N-behenyl behenamide, N-stearyl behenamide, N-behenyl stearamide, N-oleyl oleamide, N-oleyl stearamide, N-stearyl oleamide, N-stearyl erucamide, erucyl stearamide, erucyl erucamide, N-oleyl palmitamide, methylol stearamide, methylol behenamide, methylene bis-stearamide, ethylene bis-stearamide, ethylene bis-isostearamide, ethylene bis-hydroxystearamide, ethylene bis-behenamide, hexamethylene bis-stearamide, hexamethylene bis-behenamide, hexamethylene bis-hydroxystearamide, N,N'-distearyl adipamide, and N,N'-distearyl sebacamide, ethylene bis-oleamide, hexamethylene bis-oleamide, N,N'-dioleyl adipamide, and N,N'-dioleyl sebacamide; and up to about 50 weight percent of a mineral filler;

wherein all the weight percentages are based on the total weight of the composition.

14. A resin composition consisting of:

about 95.0 weight percent to about 99.9 weight percent of a polyetherimide; and about 0.1 weight percent to about 5.0 weight percent of a fatty amide selected from the group consisting of lauramide, palmitamide, arachidamide, behenamide, stearamide, 12-hydroxystearamide, oleamide, erucamide, recinoleamide, N-stearyl stearamide, N-behenyl behenamide, N-stearyl behenamide, N-behenyl stearamide, N-oleyl oleamide, N-oleyl stearamide, N-stearyl oleamide, N-stearyl erucamide, erucyl stearamide, erucyl erucamide, N-oleyl palmitamide, methylol stearamide, methylol behenamide, methylene bis-stearamide, ethylene bis-stearamide, ethylene bis-isostearamide, ethylene bis-hydroxystearamide, ethylene bis-behenamide, hexamethylene bis-stearamide, hexamethylene bis-behenamide, hexamethylene bis-hydroxystearamide, N,N'-distearyl adipamide, and N,N'-distearyl sebacamide, ethylene bis-oleamide, hexamethylene bis-oleamide, N,N'-dioleyl adipamide, and N,N'-dioleyl sebacamide; and wherein all the weight percentages are based on the total weight of the composition.

15. An article comprising the composition of claim 1.

16. An article consisting of the composition of claim 1.

17. A cookware article comprising the composition of claim 1.

18. A cookware article consisting of the composition of claim 1.

\* \* \* \* \*